United States Patent Office 3,215,689
Patented Nov. 2, 1965

3,215,689
AMINOALKYL ESTERS OF 3β-HYDROXYPREGN-5-EN-20-ONE
Charles W. Marshall, Skokie, Ill., assignor to G. D. Searle & Co., Chicago, Ill., a corporation of Delaware
No Drawing. Filed Oct. 12, 1962, Ser. No. 230,248
9 Claims. (Cl. 260—239.5)

The application for Letters Patent securing the invention herein described and claimed is a continuation-in-part of applicant's prior copending application Serial No. 132,003 filed August 17, 1961, since abandoned.

This invention relates to aminoalkyl esters of 3β-hydroxypregn-5-en-20-one. More particularly, this invention relates to steroids of the formula

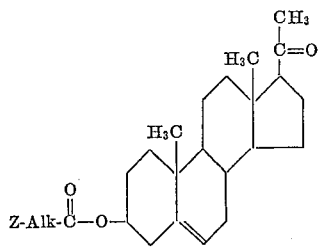

wherein Z represents an optionally-alkylated amino radical and Alk represents an alkylene radical.

The symbol, Z, subsumes both the primary amino radical, $-NH_2$, and secondary and tertiary amino radicals wherein 1 or 2 alkyl, hydroxyalkyl, or phenylalkyl groupings are present. Among the latter groupings, especially lower alkyl, hydroxy (lower alkyl), and phenyl (lower alkyl) radicals are preferred. Illustrative of lower alkyl radicals are methyl, ethyl, propyl, isopropyl, butyl, isobutyl, sec-butyl, tert-butyl, pentyl, isopentyl, tert-pentyl, neopentyl, hexyl, isohexyl, and like $-C_nH_{2n+1}$ groupings wherein $n$ represents a positive integer amounting to less than 7.

When the amino radical represented by Z is substituted by 1 or 2 alkyl or hydroxyalkyl groupings, the substituent groupings can be either discreet, as for example when Z designates a radical of the formula

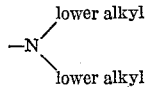

or they can be joined together directly or through oxygen or a second nitrogen to compose cyclic amino radicals optimally comprising at least 4 carbon atoms. Illustrative of the cyclic amino radicals contemplated by Z are pyrrolidino, 2-methylpyrrolidino, 2,5-dimethylpyrrolidino, 3-methyl-4-ethylpyrrolidino, piperidino, 3-methylpiperidino, 2,6-dimethylpiperidino, morpholino, piperazino, 4-methylpiperazino, 4-ethylpiperazino, 4 - hydroxyethylpiperazino, and like monovalent, 5- and 6-membered heterocyclic groupings. The terminal "ino" in the radical name set forth denotes attachment of the radicals thus identified via nitrogen.

The alkylene radicals represented by Alk, like the alkyl and hydroxyalkyl groupings comprehended when Z represents a secondary or tertiary amino radical, are most desirably of lower order. Typical of lower alkylene radicals are methylene, ethylene, trimethylene, 1,2-propylene, 2,2-dimethyl-1,3-propylene, tetramethylene, and homologous, bivalent, saturated, acyclic, straight-or branched-chain hydrocarbon groupings embracive of fewer than 7 carbon atoms.

Equivalent to the above-described amino esters for purposes of the present invention are their non-toxic acid addition salts, the composition of which is depicted by

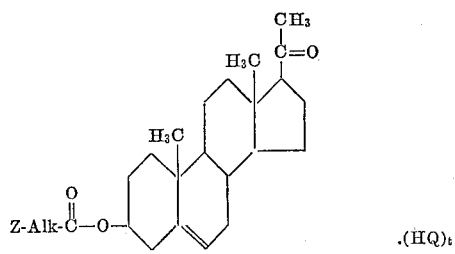

wherein Z and Alk are defined as before; Q represents one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $t$ represents 1 except when Z comprises a piperazino or other dibasic amino radical, in which case $t$ represents either 1 or 2.

The compounds to which this invention relates are useful because of their valuable pharmacological properties. Thus, for example, they are both anti-convulsant and anti-psychotic in dosages whereat prior art compounds distinguished by the absence of a 5(6) double bond (see U.S. 2,708,651). Undesirably depree the central nervous system. Their anti-convulsant effect is the more remarkable because it is not observed in corresponding amino ethers. Other useful pharmacological properties of the subject compounds include anorectic, anti-arrhythmic, and anti-atherogenic activity.

Manufacture of the claimed products proceeds by heating together, preferably in an inert solvent and with an alkaline catalyst such as sodium iodide present, a steroid of the formula

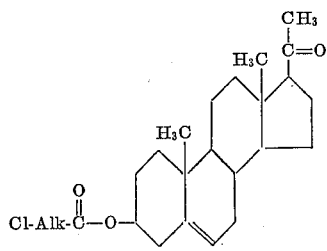

and an amine of the formula

Alk and Z in the formulas being defined as before. Conversion of the amine bases hereof to corresponding acid addition salts is accomplished by simple admixture of these compounds with either 1 or 2 equivalents of any of various inorganic and strong organic acids, the anionic portion of which conforms to Q as hereinabove defined.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Infrared absorption data refer to determinations made in chloroform solution.

Example 1

(A) *3β-chloroacetoxypregn-5-en-20-one.*—To a solution of 20 parts of 3β-hydroxypregn-5-en-20-one ("pregnenolone") in 630 parts of anhydrous benzene is added, with agitation at 45°, 15 parts of chloroacetyl chloride, followed by 15 parts of s-collidine. The resultant mixture is maintained at 35–45° with agitation for 4 hours, whereupon it is diluted with 840 parts of anhydrous ether to complete the precipitation of s-collidine hydrochloride, which is removed by filtration. The filtrate is washed successively with dilute hydrochloric acid, dilute aqueous sodium carbonate, water, and brine, then dried over anhydrous sodium sulfate and freed of solvent by distillation. The residue is 3β-chloroacetoxypregn-5-en-20-one, which is characterized by principal absorption bands in the infrared spectrum at 5.77, 5.82, 8.10, and 8.35μ, and which melts at approximately 161–162°.

(B) *3β-pyrrolidinoacetoxypregn-5-en-20-one.*—To a mixture of 203 parts of 3β-chloroacetoxypregn-5-en-20-one and 111 parts of pyrrolidine in 24,000 parts of anhydrous acetone at 25–35° is added 330 parts of anhydrous sodium iodide. The resultant mixture is maintained at 25–35° with agitation for 3 hours, whereupon the bulk of the solvent is removed by vacuum distillation and the slushy residue is suspended in 20,000 parts of aqueous 5% sodium carbonate. The suspension is extracted with 40,000 parts of ether. The ether extract is washed successively with dilute aqueous sodium carbonate, water, and brine, then dried over anhydrous sodium sulfate and stripped of solvent by distillation. Excess pyrrolidine is removed from the residue by vacuum distillation, leaving 3β-pyrrolidinoacetoxypregn-5-en-20-one, which is characterized by principal absorption bands in the infrared spectrum at 5.73, 5.85, 7.98, and 8.18μ. The product has the formula

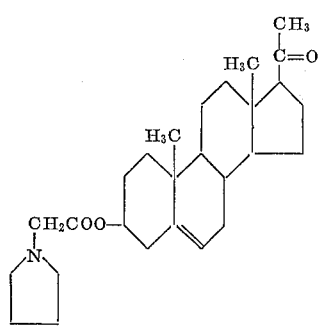

(C) *3β - pyrrolidinoacetoxypregn-5-en-20-one hydrochloride.*—A solution of 22 parts of 3β-pyrrolidinoacetoxypregn-5-en-20-one in 560 parts of anhydrous ether at 15–17° is made slightly acid, during agitation, with an absolute 2-propanolic solution of hydrogen chloride. The precipitate thrown down is filtered off and, upon recrystallization from a mixture of ethanol and ethyl acetate, affords 3β-pyrrolidinoacetoxypregn-5-en-20-one as sheaves of slender blades melting at approximately 234–235°.

Example 2

(A) *3β - (3 - chloropropionyloxy)pregn-5-en-20-one.*—Substitution of 16 parts of 3-chloropropionyl chloride for the chloroacetyl chloride called for in Example 1A affords, by the procedure there detailed 3β-(3-chloropropionyloxy)pregn-5-en-20-one, which is characterized by principal bands in the infrared spectrum at 5.75, 5.85, 7.92, 8.15, and 8.65μ, and which melts at approximately 116–117°.

(B) *3β-(3-pyrrolidinopropionyloxy)pregn - 5 - en - 20- one.*—To a mixture of 50 parts of 3β-(3-chloropropionyloxy)pregn-5-en-20-one and 18 parts of pyrrolidine in 2400 parts of anhydrous acetone at 25–35° is added 33 parts of anhydrous sodium iodide. The resultant mixture is maintained at 25–35° with agitation for 3 hours, whereupon the bulk of the solvent is removed by vacuum distillation and the slushy residue is suspended in 2000 parts of aqueous 5% sodium carbonate. The suspension is extracted with 4000 parts of ether. The ether extract is washed successively with dilute aqueous sodium carbonate, water, and brine, then dried over anhydrous sodium sulfate and stripped of solvent by distillation. Excess pyrrolidine is removed from the residue by vacuum distillation, leaving 3β-(3-pyrrolidinopropionyloxy)pregn-5-en-20-one, which is characterized by principal absorption bands in the infrared spectrum at 5.77, 5.85, and 8.27μ. The product has the formula

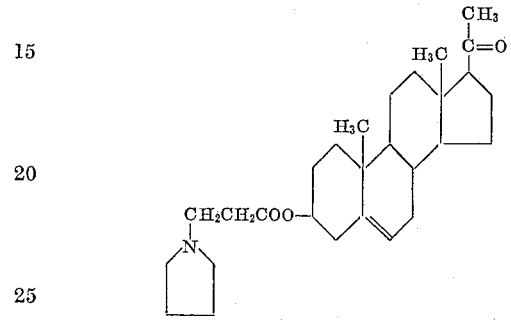

(C) *3β-(3-pyrrolidinopropionyloxy)pregn - 5 - en - 20- one hydrochloride.*—A solution of 26 parts of 3β-(3-pyrrolidinopropionyloxy)pregn-5-en-20-one in 1050 parts of anhydrous ether is made slightly acid, during agitation, with an absolute 2-propanolic solution of hydrogen chloride. The salt which precipitates is filtered off. Upon recrystallization from absolute ethanol, it affords 3β-(3-pyrrolidinopropionyloxy)pregn-5-en-20-one hydrochloride as long thick needles melting at approximately 219–220°.

Example 3

(A) *3β-(4-chlorobutyryloxy)pregn-5 - en - 20 - one.*—Substitution of 18 parts of 4-chlorobutyryl chloride for the chloroacetyl chloride called for in Example 1A affords, by the procedure there detailed, 3β-(4-chlorobutyryloxy)pregn-5-en-20-one, which is characterized by principal bands in the infrared spectrum at 5.75, 5.87, 8.00, and 8.38μ, and which melts at approximately 140–141°.

(B) *3β-(4-pyrrolidinobutyryloxy)pregn-5-en-20-one.*—To a mixture of 27 parts of 3β-(4-chlorobutyryloxy)pregn-5-en-20-one and 18 parts of pyrrolidine in 2400 parts of anhydrous acetone at the boiling point under reflux is added, with agitation, 33 parts of anhydrous sodium iodide. The resultant mixture is maintained at the boiling point under reflux with agitation for 20 hours, whereupon the bulk of the solvent is removed by vacuum distillation and the slushy residue is suspended in 2000 parts of aqueous 5% sodium carbonate. The suspension is extracted with 4000 parts of ether. The ether extract is washed successively with dilute aqueous sodium carbonate, water, and brine, then dried over anhydrous sodium sulfate and stripped of solvent by distillation. Excess pyrrolidine is removed from the residue by vacuum distillation, leaving 3β - (4-pyrrolidinobutyryloxy) pregn-5-en-20-one, which is characterized by principal bands in the infrared spectrum at 5.77, 5.86, and 8.45μ. The product has the formula

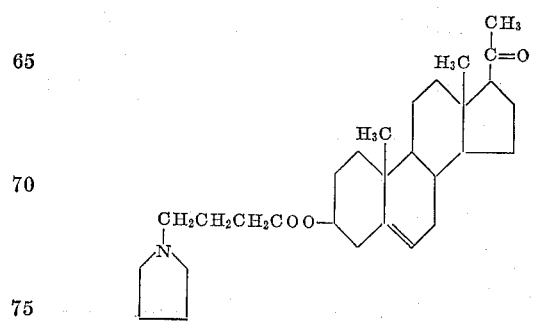

NOTE.—Shorter reaction times and temperatures tend to result in somewhat diminished yields of product.

(C) *3β-(4-pyrrolidinobutyryloxy)pregn-5-en - 20 - one hydrochloride.*—A solution of 218 parts of 3β-(4-pyrrolidinobutyryloxy)pregn-5-en-20-one in 10,500 parts of anhydrous ether at 15–17° is made slightly acid, during agitation, with an absolute 2-propanolic solution of hydrogen chloride. The precipitate which forms is filtered off and, upon recrystallization from absolute ethanol, affords 3β-(4-pyrrolidinobutyryloxy)pregn-5-en - 20 - one hydrochloride as spear prisms solvated with ethanol. The product thus isolated melts at approximately 135°, resolidifies above this temperature, and melts again at approximately 200–201° provided heating is sufficiently rapid. Otherwise, the ethanol of solvation is evaporated without the lower melting point being observed.

*Example 4*

*3β-piperidinoacetoxypregn-5-en-20 - one.*—Substitution of 85 parts of piperidine for the pyrrolidine called for in Example 1B affords, by the procedure there detailed, 3β-piperidinoacetoxypregn-5-en-20-one, which is characterized by principal bands in the infrared spectrum at 5.76, 5.85, and 8.22μ. The product has the formula

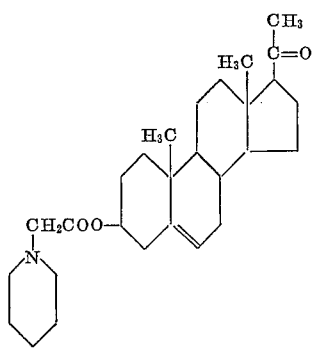

*Example 5*

(A) *3β-(3-piperidinopropionyloxy)pregn - 5 - en - 20-one.*—To a mixture of 122 parts of 3β-(3-chloropropionyloxy)pregn-5-en-20-one and 76 parts of piperidine in 24,000 parts of anhydrous acetone at 25–35° is added 330 parts of anhydrous sodium iodide. The resultant mixture is maintained at 25–35° with agitation for 24 hours, whereupon the bulk of the solvent is removed by vacuum distillation and the slushy residue is suspended in 20,000 parts of aqueous 5% sodium carbonate. The suspension is extracted with 40,000 parts of ether. The ether extract is washed successively with dilute aqueous sodium carbonate, water, and brine, then dried over anhydrous sodium sulfate and stripped of solvent by distillation. Excess piperidine is removed from the residue by vacuum distillation, leaving 3β-(3-piperidinopropionyloxy)pregn-5-en-20-one, which is characterized by principal absorption bands in the infrared spectrum at 5.77, 5.86, 8.18, and 8.34μ. The product has the formula

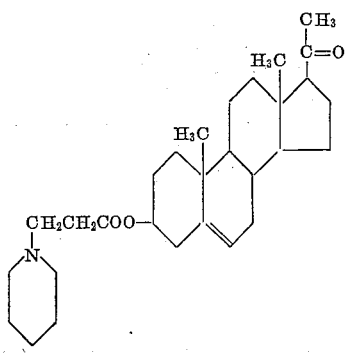

(B) *3β-(3-piperidinopropionyloxy)pregn-5-en-20 - one hydrochloride.*—A solution of 136 parts of 3β-(3-piperidinopropionyloxy)pregn-5-en-20-one in 8400 parts of anhydrous ether at approximately 15° is made slightly acid, during agitation, with an absolute 2-propanolic solution of hydrogen chloride. The salt which precipitates is filtered off and recrystallized from absolute ethanol. The 3β-(3-piperidinopropionyloxy)pregn-5-en-20 - one hydrochloride thus isolated is obtained as long fine feathery needles melting at approximately 236–236.5°.

*Example 6*

(A) *3β-(3-piperazinopropionyloxy)pregn - 5 - en - 20-one.*—Substitution of 80 parts of 3β-(3-chloropropionyloxy)pregn-5-en-20-one and 86 parts of piperazine for the 3β-chloroacetoxypregn-5-en-20-one and pyrrolidine, respectively, called for in Example 1B affords, by the procedure there detailed, 3β-(3-piperazinopropionyloxy)pregn-5-en-20-one, which is characterized by principal bands in the infrared spectrum at 5.76, 5.84, and 8.40μ. The product has the formula

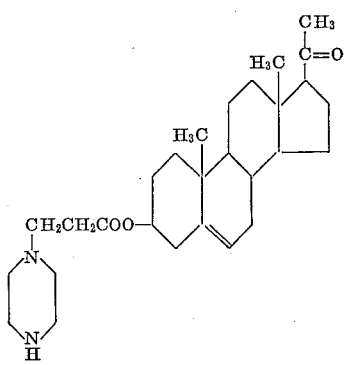

(B) *3β - (3 - piperazinopropionyloxy)pregn - 5 - en-20-one hydrochloride.*—A solution of 9 parts of 3β-(3-piperazinopropionyloxy)pregn - 5 - en - 20 - one in 79 parts of acetone is diluted with 560 parts of anhydrous ether, chilled to 10–15°, and finally made slightly acid—during agitation—with an absolute 2-propanolic solution of hydrogen chloride. The salt which precipitates is filtered off. Upon recrystallization from a mixture of ethanol and ethyl acetate, it affords 3β-(3-piperazinopropionyloxy)pregn - 5 - en - 20 - one hydrochloride as slender flat blades solvated with ethanol. The product thus isolated melts at approximately 165°, resolidifies above this temperature, and melts again at 188–190° provided heating is sufficiently rapid. Otherwise, the ethanol of solvation is evaporated without the lower melting point being observed.

*Example 7*

*3β - [3 - (4 - methylpiperazino)propionyloxy]pregn-5 - en - 20 - one.*—Substitution of 100 parts of 3β - (3-chloropropionyloxy)pregn-5-en-20-one and 65 parts of N-methylpiperazine for the 3β - chloroacetoxypregn - 5-en-20-one and pyrrolidine, respectively, called for in Example 1B affords, by the procedure there detailed, 3β-[3 - (4 - methylpiperazino)propionyloxy]pregn - 5 - en-20-one, which is characterized by principal bands in the infrared spectrum at 5.76, 5.85, and 8.2μ. The product has the formula

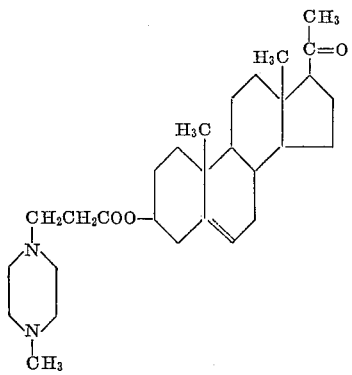

Example 8

(A) *3β - (3morpholinopropionyloxy)pregn - 5 - en-20-one.*—To a mixture of 122 parts of 3β - (3 - chloropropionyloxy)pregn - 5 - en - 20 - one and 78 parts of morpholine in 24,000 parts of anhydrous acetone at 25–35° is added 330 parts of anhydrous sodium iodide. The resultant mixture is maintained at 25–35° with agitation for 40 hours, whereupon the bulk of the solvent is removed by vacuum distillation and the slushy residue is suspended in 20,000 parts of aqueous 5% sodium carbonate. The suspension is extracted with 40,000 parts of ether. The ether extract is washed successively with dilute aqueous sodium carbonate, water, and brine, then dried over anhydrous sodium sulfate and stripped of solvent by distillation. Excess morpholine is removed from the residue by vacuum distillation, leaving 3β - (3-morpholinopropionyloxy)pregn - 5 - en - 20 - one, which is characterized by principal bands in the infrared spectrum at 5.77, 5.84, and 8.32μ. The product has the formula

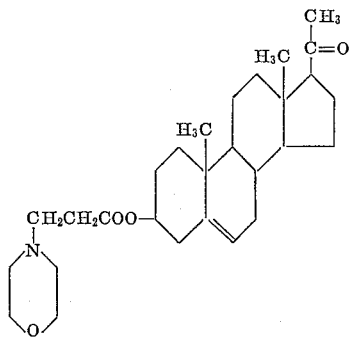

(B) *3β - (3 - morpholinopropionyloxy)pregn - 5 - en-20-one hydrochloride.*—A solution of 135 parts of 3β-(3 - morpholinopropionyloxy)pregn - 5 - en - 20 - one in 5600 parts of anhydrous ether at approximately 15° is made slightly acid, during agitation, with an absolute 2-propanolic solution of hydrogen chloride. The salt which precipitates is filtered off and recrystallized from absolute ethanol to give 3β - (3 - morpholinopropionyloxy)pregn-5-en-20-one hydrochloride as heavy blades melting at approximately 229–230°.

Example 9

(A) *3β - (3 - diethylaminopropionyloxy)pregn - 5 - en-20-one.*—Substitution of 100 parts of 3β-(3-chloropropionyloxy)pregn - 5 - en - 20 - one and 55 parts of diethylamine for the 3β - chloroacetoxypregn - 5 - en - 20-one and pyrrolidine, respectively, called for in Example 1B affords, by the procedure there detailed, 3β-(3-diethylaminopropionyloxy)pregn - 5 - en - 20 - one, which is characterized by principal bands in the infrared absorption spectrum at 5.77, 5.82, and 8.20μ. The product has the formula

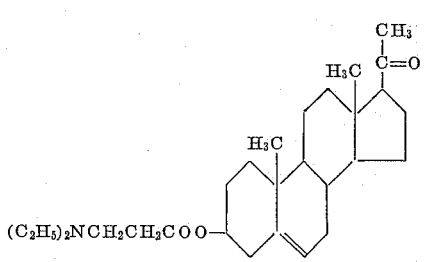

(B) *3β - (3 - diethylaminopropionyloxy)pregn - 5 - en - 20 - one hydrochloride.*—A solution of 11 parts of 3β - (3 - diethylaminopropionyloxy)pregn-5-en-20-one in 840 parts of anhydrous ether is made slightly acid, during agitation, with an absolute 2-propanolic solution of hydrogen chloride. The salt which precipitates is filtered off and recrystallized from absolute ethanol to give 3β - (3 - diethylaminopropionyloxy)pregn - 5 - en-20-one hydrochloride as massive rosette clusters of fine needles melting at approximately 209–210°.

Example 10

(A) *3β - {3 - [N - (2 - hydroxyethyl)methylamino] - propionyloxy}pregn - 5 - en - 20 - one.*—To a mixture of 122 parts of 3β - (3 - chloropropionyloxy)pregn - 5 - en-20-one and 23 parts of N-(2-hydroxyethyl)methylamine in 1600 parts of anhydrous acetone at 25–35° is added 60 parts of triethylamine and 90 parts of anhydrous sodium iodide. The resultant mixture is maintained at 25–35° for 44 hours, whereupon the bulk of the solvent is removed by vacuum distillation and the slushy residue is suspended in 10,000 parts of aqueous 5% sodium carbonate. The suspension is stored at 0–5° for 24 hours, then filtered. The solids thus isolated are washed with water and taken up in 8400 parts of ether. The ether solution is washed successively with aqueous 5% sodium carbonate containing 5% sodium chloride, aqueous 5% sodium chloride, and saturated brine. It is thereupon dried over anhydrous sodium sulfate and stripped of solvent by distillation. The residue is 3β-{3-[N-(2 - hydroxyethyl)methylamino]propionyloxy}pregn - 5-en-20-one, which is characterized by principal bands in the infrared spectrum at 2.92, 5.77, 5.82, and 8.35μ. The product has the formula

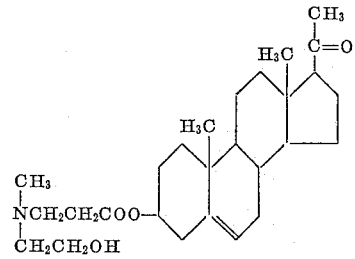

(B) *3β - {3 - [N - (2 - hydroxyethyl)methylamino] - propionyloxy}pregn - 5 - en - 20 - one hydrochloride.*—A solution of 128 parts of 3β - {3 - [N - (2 - hydroxyethyl) methylamino]propionyloxy}pregn - 5 - en - 20 - one in 8400 parts of anhydrous ether at approximately 16° is made slightly acid, during agitation, with an absolute 2-propanolic solution of hydrogen chloride. The resultant mixture is stored at 0–5° overnight. The precipitate which forms is filtered off and recrystallized from absolute ethanol. The product thus isolated is 3β - {3 - [N - (2 - hydroxyethyl)methylamino]propionyloxy}pregn - 5 - en-20-one hydrochloride, obtained as clusters of thin plate crystals melting at approximately 207–207.5°.

Example 11

3β - {3 - [di(2 - hydroxyethyl)amino]propionyloxy} - pregn - 5 - en - 20 - one.—To a mixture of 80 parts of 3β-(3 - chloropropionyloxy)pregn - 5 - en - 20 - one and 63 parts of 2,2′-iminodiethanol in 24,000 parts of anhydrous acetone at 25–35° is added 330 parts of anhydrous sodium iodide. The resultant mixture is maintained at 25–35° with agitation for 3 hours, whereupon the bulk of the solvent is removed by vacuum distillation and the slushy residue is suspended in 20,000 parts of aqueous 5% sodium carbonate. The suspension is extracted with 40,000 parts of ether. The ether extract is washed successively with dilute aqueous sodium carbonate and brine, then dried over anhydrous sodium sulfate and stripped of solvent by distillation. Excess amine is removed from the residue by vacuum distillation, leaving 3β-{3-[di(2-hydroxyethyl)amino]propionyloxy}pregn - 5 - en - 20 - one, which is characterized by principal bands in the infrared spectrum at 2.95, 5.77, 5.83, 8.18, and 8.42μ. The product has the formula

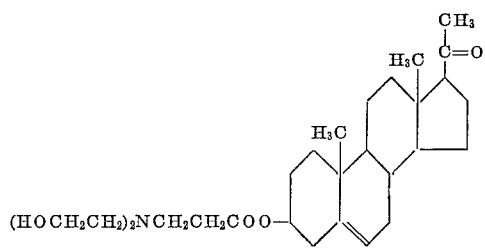

Example 12

(A) 3β - {3 - [(N-benzyl)methylamino]propionyloxy} - pregn-5-en-20-one.—To a mixture of 122 parts of 3β-(3-chloropropionyloxy)pregn-5-en-20-one and 73 parts of (N-benzyl)methylamine in 1600 parts of butanone at 25–35° is added 330 parts of anhydrous sodium iodide. The resultant mixture is heated at 60–65° for approximately 21 hours, whereupon the bulk of the solvent is removed by vacuum distillation and the slushy residue is suspended in 20,000 parts of aqueous 5% sodium carbonate. The suspension is extracted with 40,000 parts of ether. The ether extract is washed successively with dilute aqueous sodium carbonate, water, and brine, then dried over anhydrous sodium sulfate, filtered, and mixed with 100 parts of acetic anhydride. This mixture is allowed to stand at 15° for 1 hour, following which it is heated at the boiling point under reflux for 1 hour. Approximately 70 parts of ethanol is introduced to destroy excess acetic anhydride, after which the mixture is successively washed with aqueous 5% sodium bicarbonate and water, dried over anhydrous sodium sulfate, and finally filtered. The filtrate is made slightly acid with 2-propanolic hydrogen chloride; and the precipitate thrown down is isolated by filtration, whereupon it is mixed thoroughly with aqueous 5% sodium carbonate. The mixture thus obtained is extracted with ether. The ether extract is washed with water, dried over anhydrous sodium sulfate, and stripped of solvent by distillation, leaving 3β-{3-[(N-benzyl)methylamino]propionyloxy}pregn - 5 - en - 20 - one as the residue. The product is characterized by absorption bands in the infrared spectrum at 5.75, 5.86, 6.65, 8.22, and 8.37μ. It has the formula

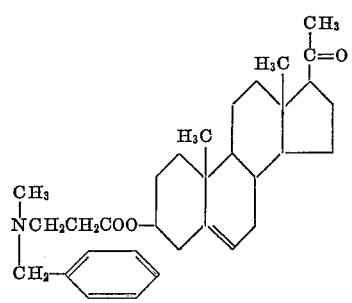

(B) 3β - {3 - [(N - benzyl)methylamino]propionyloxy}pregn - 5 - en - 20 - one hydrochloride.—A solution of 14 parts of 3β - {3 - [(N - benzyl)methylamino]propionyloxy}pregn-5-en-20-one in 1120 parts of anhydrous ether is made slightly acid, during agitation, with an absolute 2-propanolic solution of hydrogen chloride. The salt which precipitates is filtered off. Upon recrystallization from absolute ethanol, it affords 3β-{3-[(N-benzyl)-methylamino]propionyloxy}pregn - 5 - en - 20 - one hydrochloride as needles melting at approximately 204–205°.

What is claimed is:
1. A compound of the formula

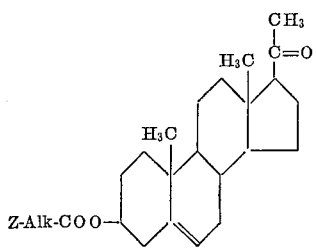

wherein Alk is a lower alkylene radical and Z is a member of the class consisting of pyrrolidino, piperidino, piperazino, 4-(lower alkyl)piperazino, and morpholino radicals and radicals of the formula

in which R′ and R″ are members of the class consisting of lower alkyl, ω-hydroxy(lower alkyl), and benzyl radicals.

2. A compound of the formula

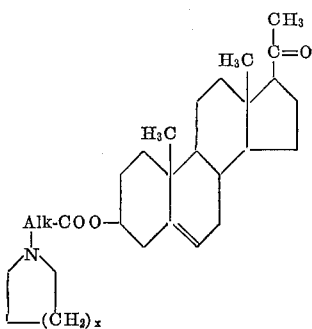

wherein Alk is a lower alkylene radical and x is a positive integer less than 3.

3. 3β - (3 - pyrrolidinopropionyloxy)pregn - 5 - en - 20-one.

4. 3β - (3 - piperazinopropionyloxy)pregn - 5 - en - 20-one.

5. 3β - [3 - (4 - methylpiperazino)propionyloxy]pregn - 5-en-20-one.

6. 3β - (3 - morpholinopropionyloxy)pregn - 5 - en - 20-one.

7. 3β - (3 - diethylaminopropionyloxy)pregn - 5 - en - 20-one.

8. 3β - {3 - [N - (2 - hydroxyethyl)methylamino]propionyloxy}pregn-5-en-20-one.

9. 3β{3 - [(N - benzyl)methylamino]propionyloxy}-pregn-5-en-20-one.

References Cited by the Examiner

UNITED STATES PATENTS 2,554,986  5/51  Heyl et al. _____ 260—397.4
3,013,009  12/61  Marshall _____ 260—239.5

LEWIS GOTTS, *Primary Examiner.*